US009973049B2

United States Patent
Chang et al.

(10) Patent No.: US 9,973,049 B2
(45) Date of Patent: May 15, 2018

(54) ELECTRIC MOTOR

(71) Applicant: Techtronic Industries Co. Ltd., Tsuen Wan, New Territories (CN)

(72) Inventors: Yi Jia Chang, Dongguan (CN); Rafael Maynez, Anderson, SC (US)

(73) Assignee: TECHTRONIC INDUSTRIES CO. LTD., Tsuen Wan, NT, Hong Kong (CN)

( * ) Notice: Subject to any disclaimer, the term of this patent is extended or adjusted under 35 U.S.C. 154(b) by 514 days.

(21) Appl. No.: 14/561,749

(22) Filed: Dec. 5, 2014

(65) Prior Publication Data

US 2015/0084456 A1    Mar. 26, 2015

Related U.S. Application Data

(63) Continuation-in-part of application No. 13/835,071, filed on Mar. 15, 2013, now Pat. No. 9,653,967, and (Continued)

(51) Int. Cl.
*H02K 1/28* (2006.01)
*H02K 1/32* (2006.01)
(Continued)

(52) U.S. Cl.
CPC ............... *H02K 1/32* (2013.01); *H02K 1/26* (2013.01); *H02K 1/28* (2013.01); *H02K 9/06* (2013.01); *H02K 13/04* (2013.01)

(58) Field of Classification Search
CPC   H02K 1/02; H02K 1/32; H02K 1/325; H02K 1/26; H02K 1/265; H02K 9/02; H02K 9/04; H02K 9/06; H02K 1/28
(Continued)

(56) References Cited

U.S. PATENT DOCUMENTS 422,681 A * 3/1890 Wray ............... H02K 15/02
                                            310/267
752,168 A * 2/1904 Holzwarth ............. H02K 9/06
                                            310/58

(Continued)

FOREIGN PATENT DOCUMENTS

| JP | 54127512 A | | 10/1979 | |
|----|-----------|---|---------|---|
| JP | 60035928 A | * | 2/1985 | ............... H02K 1/32 |
| JP | 02299436 A | * | 12/1990 | |

*Primary Examiner* — Quyen Leung
*Assistant Examiner* — Eric Johnson
(74) *Attorney, Agent, or Firm* — Michael Best & Friedrich LLP

(57) ABSTRACT

An electric motor includes a stator operable to produce a magnetic field and defining an opening, and a rotor at least partially disposed within the opening. The rotor includes a shaft extending along a rotational axis, a plurality of first core portions each including a plurality of laminations stacked contiguously on the shaft, and a second core portion coupled between each of the first core portions. The first core portions and the second core portion cooperating to define a rotor magnetic core. A plurality of windings is coupled to the rotor magnetic core, and an air flow path is partially defined by the first core portions, the second core portion, and the shaft. The air flow path includes an axial portion that passes through the shaft axially along the rotational axis and a radial portion that extends radially outward through the second core portion.

15 Claims, 14 Drawing Sheets

Related U.S. Application Data a continuation-in-part of application No. PCT/CN2014/082249, filed on Jul. 15, 2014.

(51) Int. Cl.
  *H02K 9/06* (2006.01)
  *H02K 13/04* (2006.01)
  *H02K 1/26* (2006.01)

(58) Field of Classification Search
  USPC ...... 310/58, 60 R, 216.019, 261.1, 262, 264, 310/269
  See application file for complete search history.

(56) References Cited

U.S. PATENT DOCUMENTS

| | | | |
|---|---|---|---|
| 2,504,825 A | | 4/1950 | Meyer et al. |
| 2,773,203 A | * | 12/1956 | Opel ................ H02K 1/32 310/61 |
| 3,558,943 A | | 1/1971 | Nilsson |
| 4,053,801 A | * | 10/1977 | Ray ................ H02K 1/26 310/154.08 |
| 4,800,315 A | | 1/1989 | Schulz et al. |
| 5,019,733 A | | 5/1991 | Kano et al. |
| 5,130,585 A | | 7/1992 | Iwamatsu et al. |
| 5,326,513 A | * | 7/1994 | Kubbutat ............... B29C 33/30 249/35 |
| 5,329,197 A | | 7/1994 | Kudlacik |
| 5,365,132 A | | 11/1994 | Hann et al. |
| 6,011,331 A | | 1/2000 | Gierer et al. |
| 6,570,276 B1 | | 5/2003 | Morel et al. |
| 6,815,849 B2 | | 11/2004 | Serizawa et al. |
| 6,940,192 B2 | | 9/2005 | Katsuzawa et al. |
| 6,982,506 B1 | | 1/2006 | Johnsen |
| 7,327,055 B2 | | 2/2008 | Devine |
| 7,411,323 B2 | | 8/2008 | Pfannschmidt et al. |
| 7,646,118 B2 | | 1/2010 | Yoshida et al. |
| 7,646,119 B2 | | 1/2010 | Schmidt |
| 7,696,663 B2 | | 4/2010 | Schmohl et al. |
| 7,728,468 B2 | | 6/2010 | Jeske |
| 7,732,954 B2 | | 6/2010 | Wiker et al. |
| 7,812,501 B2 | | 10/2010 | Taniyama et al. |
| 2003/0030333 A1 | * | 2/2003 | Johnsen ............... H02K 1/32 310/54 |
| 2004/0036367 A1 | | 2/2004 | Denton et al. |
| 2007/0120428 A1 | | 5/2007 | Pfannschmidt |
| 2007/0252473 A1 | | 11/2007 | Taniyama et al. |
| 2007/0273221 A1 | | 11/2007 | Kinoshita et al. |
| 2008/0020696 A1 | | 1/2008 | Van Gansen |
| 2008/0106159 A1 | | 5/2008 | Yoshida et al. |
| 2009/0261669 A1 | | 10/2009 | Sirois |
| 2010/0026112 A1 | | 2/2010 | Li et al. |
| 2014/0070641 A1 | | 3/2014 | Graman |

\* cited by examiner

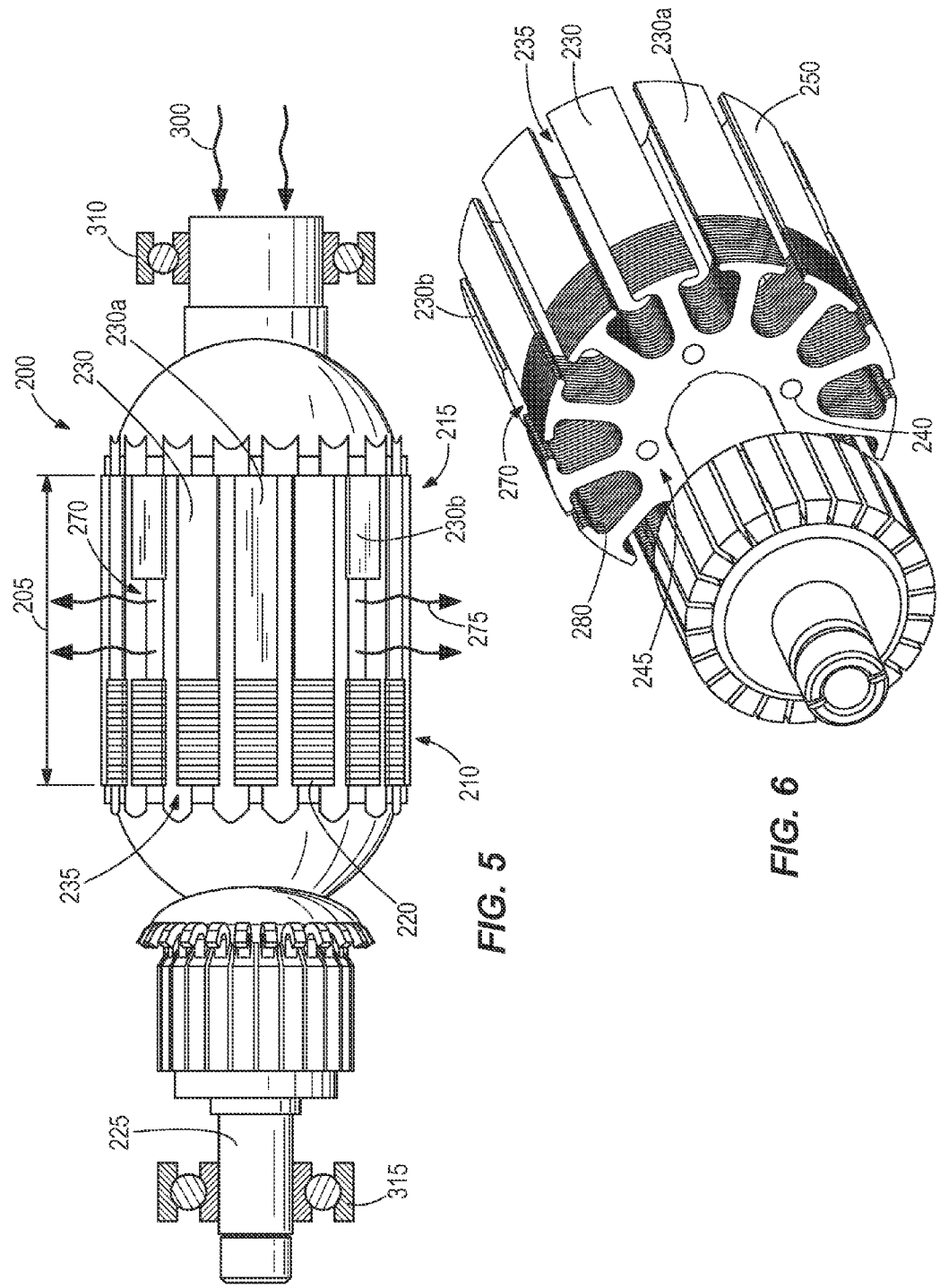

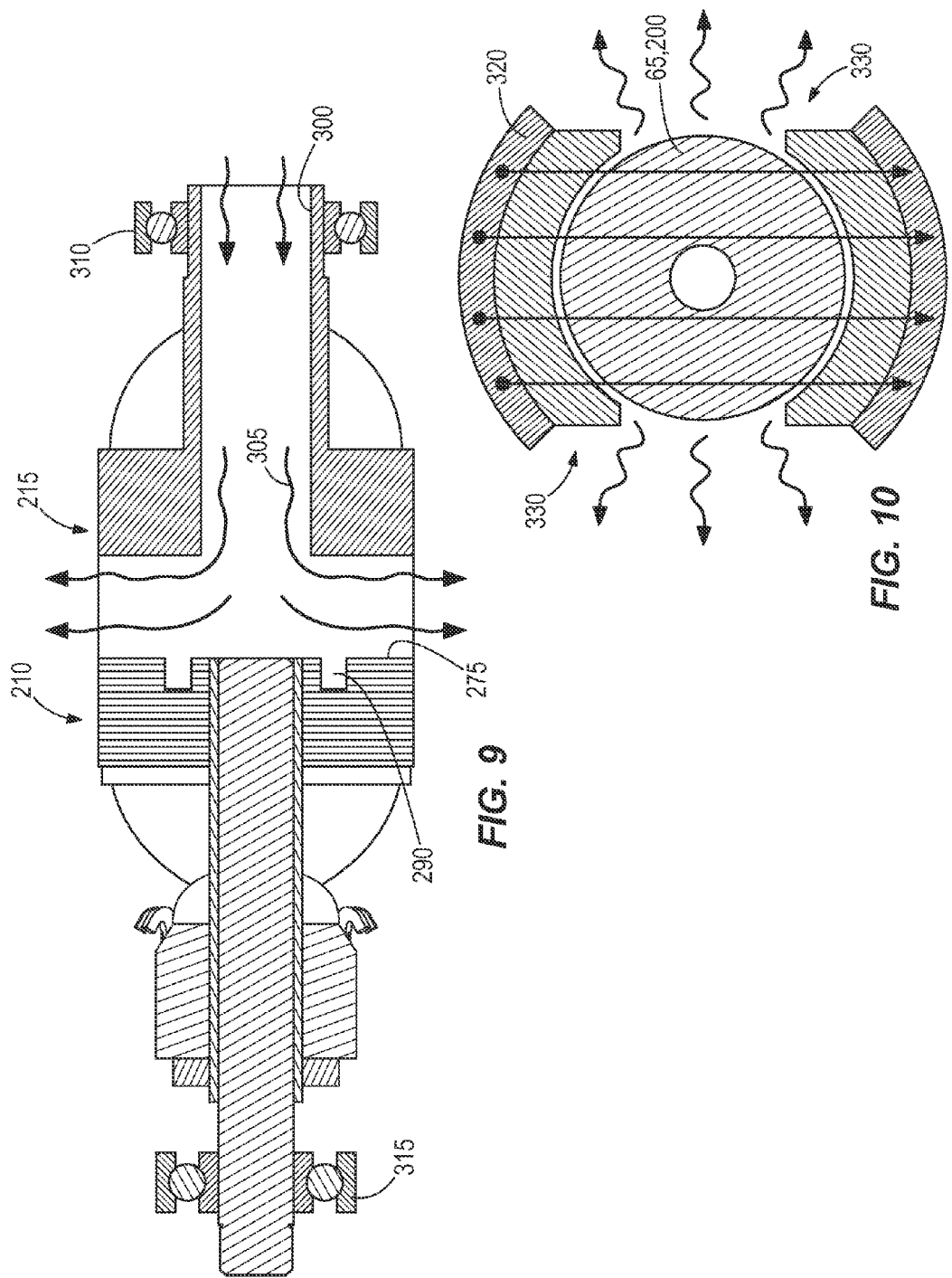

ELECTRIC MOTOR

CROSS-CITED REFERENCES

This application is a continuation in part to U.S. application Ser. No. 13/835,071, filed on Mar. 15, 2013 and a continuation in part of PCT Application No. PCT/CN2014/082249, filed on Jul. 15, 2014, the entire contents of each are incorporated herein by reference.

BACKGROUND

The present invention relates to a cooling arrangement for an electric motor. More specifically, the present invention relates to a cooling arrangement for a rotor of an electric motor.

Known cooling methods for electric motors often result in uneven temperature distributions within the motors. Known methods typically cool the exterior of the motor using cooling air generated by a fan. However, the highest temperature usually occurs at the center of the rotor where cooling air is less effective.

SUMMARY

In one construction, an electric motor includes a stator operable to produce a magnetic field, the stator defining an opening, and a rotor at least partially disposed within the opening. The rotor includes a shaft extending along a rotational axis, and a magnetic core portion supported by the shaft. The magnetic core portion includes a plurality of laminations and a plurality of windings supported by the laminations. The windings are configured to produce a magnetic field when an electric current passes through the windings. The laminations include a first type of lamination and a second type of lamination which is a different type of lamination than the first type of lamination.

In another construction, the invention provides an electric motor including a stator operable to produce a magnetic field and defining an opening, and a rotor at least partially disposed within the opening. The rotor includes a shaft extending along a rotational axis, a plurality of first core portions each including a plurality of laminations stacked contiguously on the shaft, and a second core portion coupled between each of the first core portions. The first core portions and the second core portion cooperating to define a rotor magnetic core. A plurality of windings is coupled to the rotor magnetic core, and an air flow path is partially defined by the first core portions, the second core portion, and the shaft. The air flow path includes an axial portion that passes through the shaft axially along the rotational axis and a radial portion that extends radially outward through the second core portion.

In another construction, the invention provides a power tool including a housing and an electric motor disposed within the housing. The electric motor includes a stator operable to produce a magnetic field and defining an opening, and a rotor at least partially disposed within the opening. The rotor includes a shaft extending along a rotational axis, a plurality of first core portions each including a plurality of laminations stacked contiguously on the shaft, and a second core portion coupled between each of the first core portions. The first core portions and the second core portion cooperating to define a rotor magnetic core. A plurality of windings is coupled to the rotor magnetic core, and an air flow path is partially defined by the first core portions, the second core portion, and the shaft. The air flow path includes an axial portion that passes through the shaft axially along the rotational axis and a radial portion that extends radially outward through the second core portion.

Other aspects of the invention will become apparent by consideration of the detailed description and accompanying drawings.

BRIEF DESCRIPTION OF THE DRAWINGS

FIG. 5 is a side view of another rotor embodying the invention;

FIG. 6 is a perspective view of a portion of the rotor of FIG. 5;

FIG. 9 is a section view of the rotor of FIG. 5 taken along the rotational axis of the rotor;

FIG. 10 is a schematic illustration of a motor including an open flux ring for use with the rotor of FIG. 2 or FIG. 5;

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
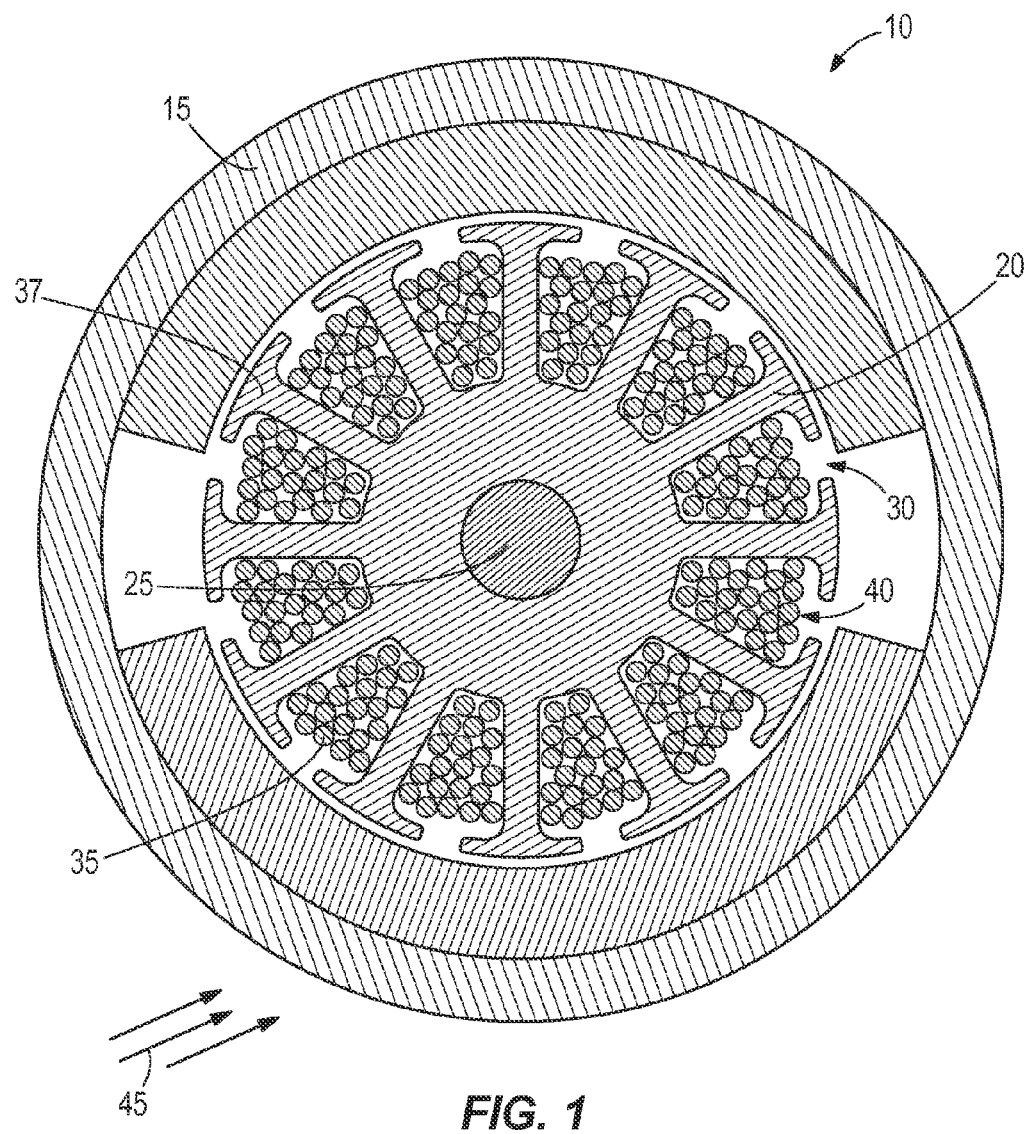
FIG. 1 is an end section view of a prior art motor illustrating heat distribution.

FIG. 1 illustrates an end view of a prior electric motor 10. The electric motor 10 includes a substantially cylindrical stator 15 operable to produce a magnetic field. A rotor 20 is supported for rotation with respect to the stator 15 and includes a solid shaft 25. The rotor 20 includes twelve slots 30 that support wires 35 that are wound around teeth 37 to define coils or windings 40 that cooperate with the teeth 37 to define rotor poles. During motor operation, electrical current flows through these windings 40 and produces heat. The heat conducts inward to quickly heat the rotor 20 and the shaft 25 to a high temperature. The heat is also transferred outward to the stator 15 via convection and radiation. Because these heat transfer processes are less efficient and because of the larger surface area of the stator 15, the stator 15 remains cooler than the rotor 20. In addition, cooling air 45 is applied to the exterior of the stator 15 to enhance the heat extraction. Thus, the rotor 20 remains quite hot when compared to the stator 15.

Figure 2:
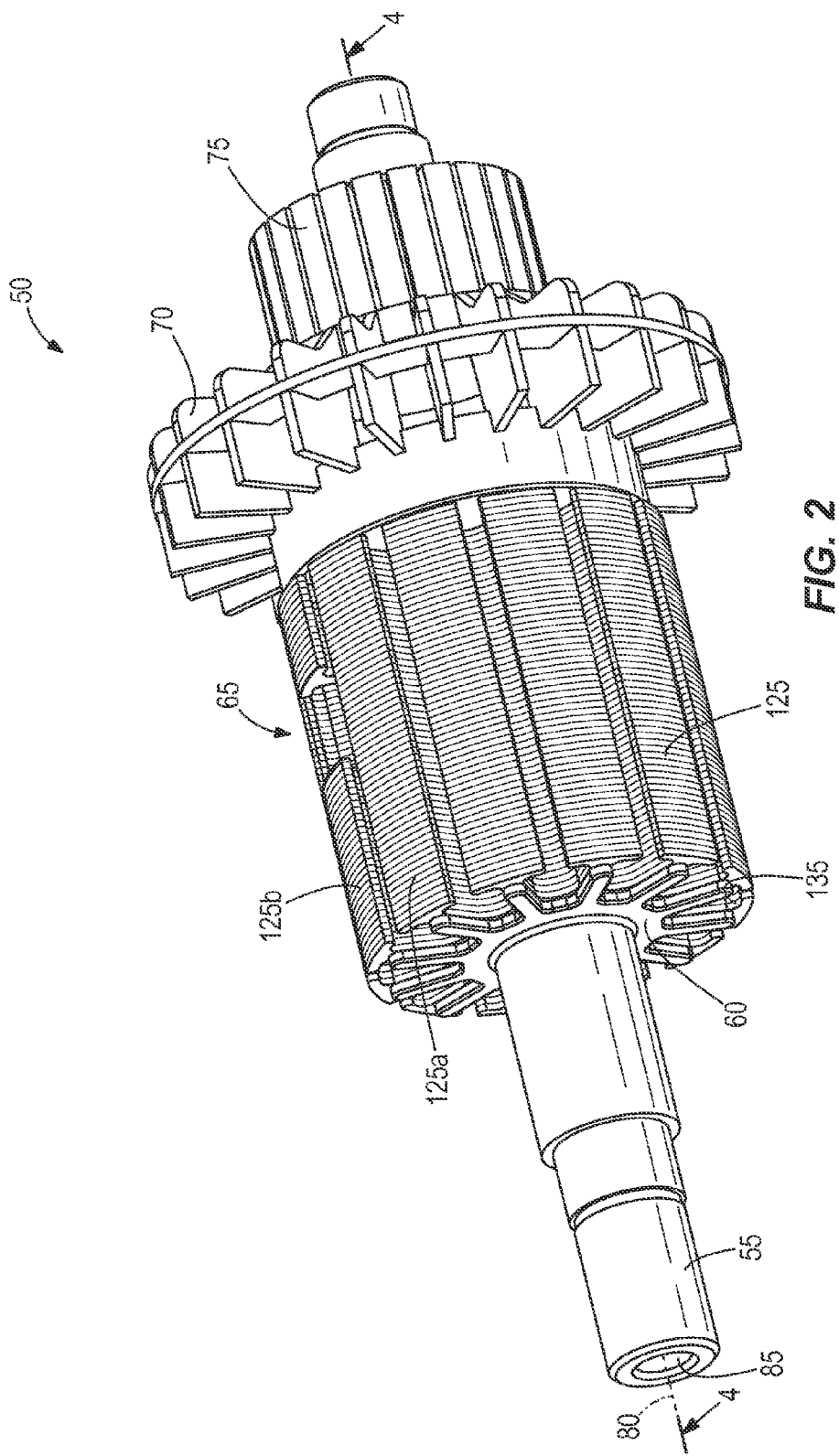
FIG. 2 is a perspective view of a rotating assembly for an electric motor having a rotor core embodying the invention.

FIG. 2 illustrates a rotor 50 suitable for use with the stator 15 of FIG. 1 or preferably with another stator as will be described with respect to FIGS. 10-12. The rotor 50 includes a shaft 55, a pair of clamps 60 (one shown), a magnetic core 65, a fan 70, and a commutator 75. The fan 70 is fixedly coupled to the shaft 55 adjacent the magnetic core 65 so that the fan 70 rotates with the shaft 55 and provides cooling air to the electric motor. In other motors, other types of fans or other fan arrangements may be employed. In some motors, the fan may be omitted entirely. The commutator 75 is fixedly coupled to the shaft 55 to periodically reverse the direction of the current in the rotor windings 40.

Figure 3:
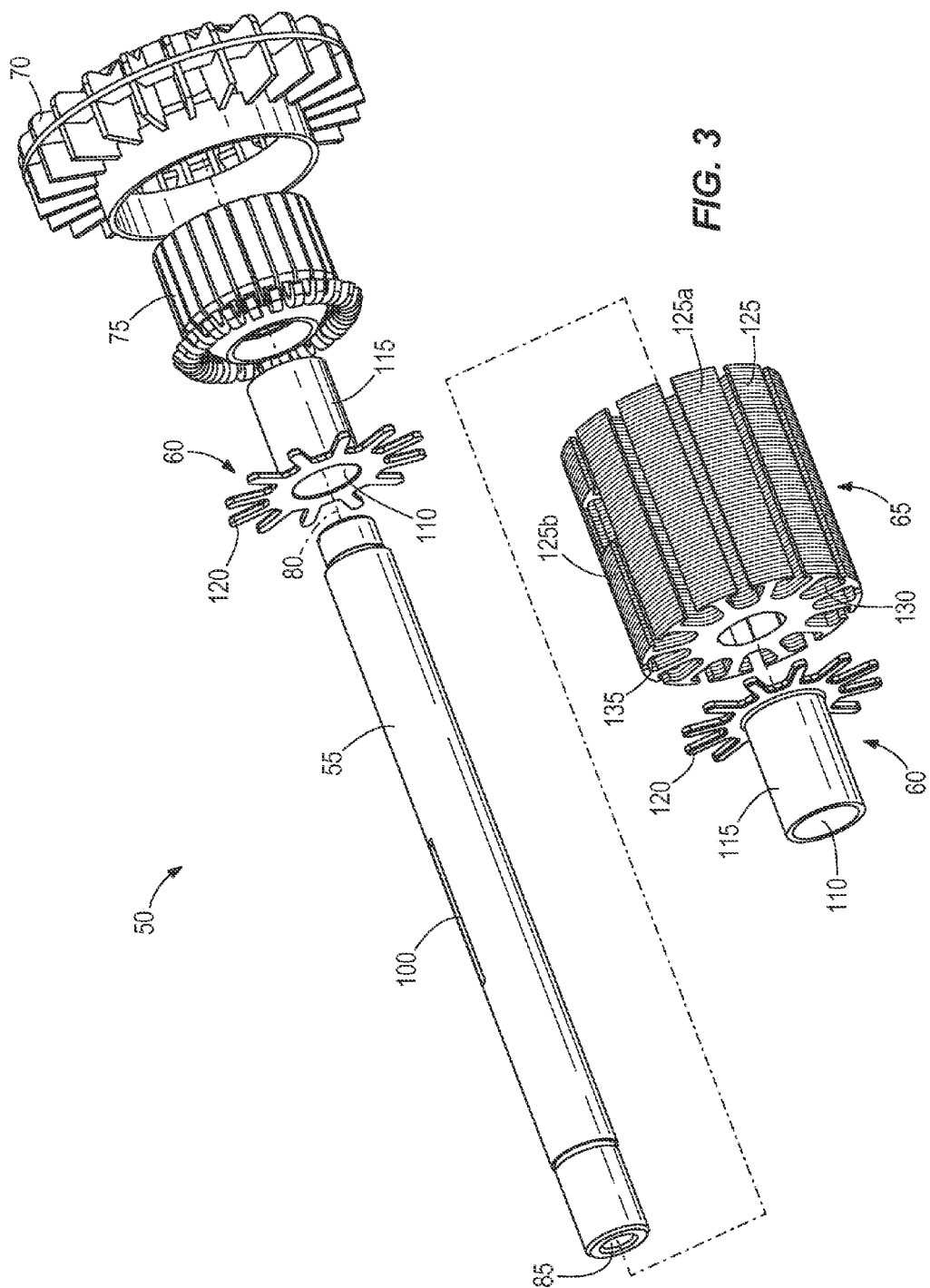
FIG. 3 is an exploded view of the rotating assembly of FIG. 2.

The shaft 55, best illustrated in FIG. 3, is an elongated substantially cylindrical member that provides rotational support to the rotating components of the motor. In the illustrated construction, the shaft 55 extends along a longitudinal or rotational axis 80 and includes a first end and a second end. A central aperture 85 extends through at least a portion of the length of the shaft 55 and defines an axial portion 90 of a cooling flow path 95 as will be discussed in detail with regard to FIG. 4. Two radial slots 100 (one on each side) are defined on an external surface of the shaft 55 and defines a portion of a radial portion 105 of the cooling flow path 95. The illustrated construction shows a single slot 100 on each side of the shaft 55 (see FIG. 4), but multiple smaller apertures could be employed in place of each slot 100 if desired.

Referring to FIGS. 2 and 3, each of the clamps 60 includes a central bore 110 sized to engage the shaft 55. Preferably, a shrink fit is provided to fixedly attach the clamps 60 to the shaft 55. Other constructions may use an adhesive, welding, soldering, brazing or another means of attachment. Each of the clamps 60 includes a central hub portion 115 and a plurality of fingers 120 that extend radially outward from an end portion of each of the central hub portions 115. The fingers 120 have a length and define slots therebetween. The central hub portions 115 and the plurality of fingers 120 have a sufficient rigidity and strength to clamp the magnetic core 65 and inhibit unwanted axial movement.

As shown in FIG. 2, the magnetic core 65 is a substantially cylindrical member that is rotationally supported by the shaft 55. The magnetic core 65 of FIG. 2 includes twelve teeth 125 with a portion of the teeth 125 being complete teeth 125a and the remainder of the teeth 125 being incomplete teeth 125b. Each tooth 125 cooperates with an adjacent tooth 125 to define a slot 130. Each tooth 125 includes two hook surfaces 135 with each of the hook surfaces 135 extending into one of two adjacent slots 130. Windings 40 are coupled to a portion of the teeth 125 and are each disposed in at least two of the slots 130 as shown in FIG. 1. Before proceeding, it should be noted that the constructions illustrated herein include twelve teeth 125 that define twelve slots 130 and therefore twelve poles. However, motors having more or fewer teeth 125 can also utilize the invention described herein. As such, the invention should not be limited to twelve pole rotors.

Figure 13:
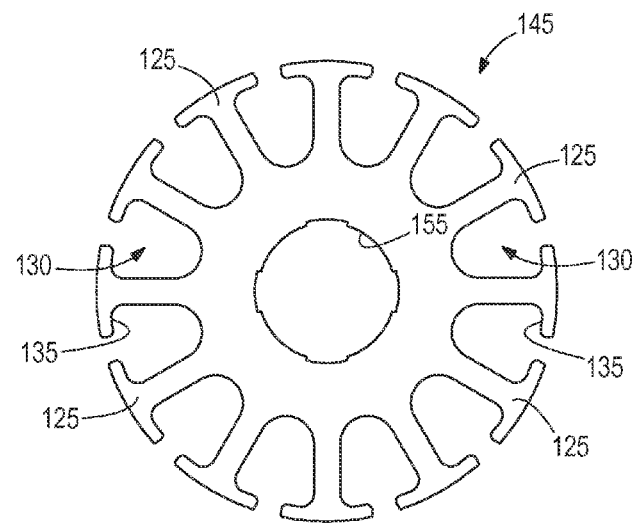
FIG. 13 is an end view of a first or complete lamination.
Figures 14, 15:
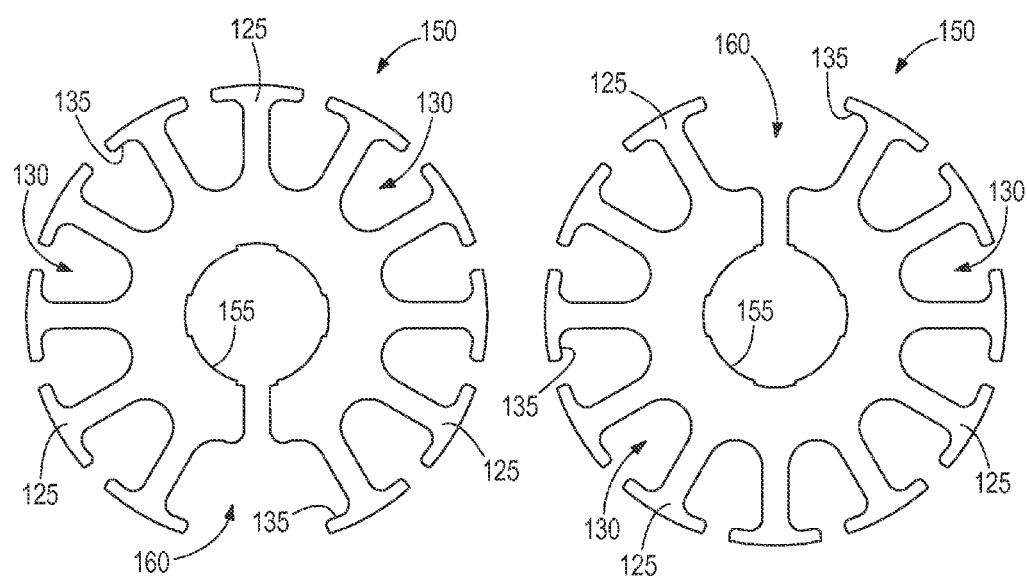
FIG. 14 is an end view of a second or partial lamination.
FIG. 15 is an end view of the second lamination rotated 180 degrees with respect to the lamination of FIG. 14.

The magnetic core 65 of FIG. 2 is formed from a plurality of laminations that are stacked along the rotational axis 80 to define a core length 140. In the illustrated construction two different laminations 145, 150 are stacked in three different portions to complete the magnetic core 65. The first lamination 145, illustrated in FIG. 13 includes twelve teeth 125 and extends completely around a central bore 155. The second lamination 150, shown in FIGS. 14 and 15 includes eleven teeth 125 with a slot 160 formed in place of the twelfth tooth and extending from the central bore 155 to the outermost portion of the lamination 150. A first magnetic core portion 165 is formed by stacking a plurality of the first laminations 145 along a first portion 170 of the core length 140. Thus, the first magnetic core portion 165 includes twelve complete teeth 125a.

Figure 4:
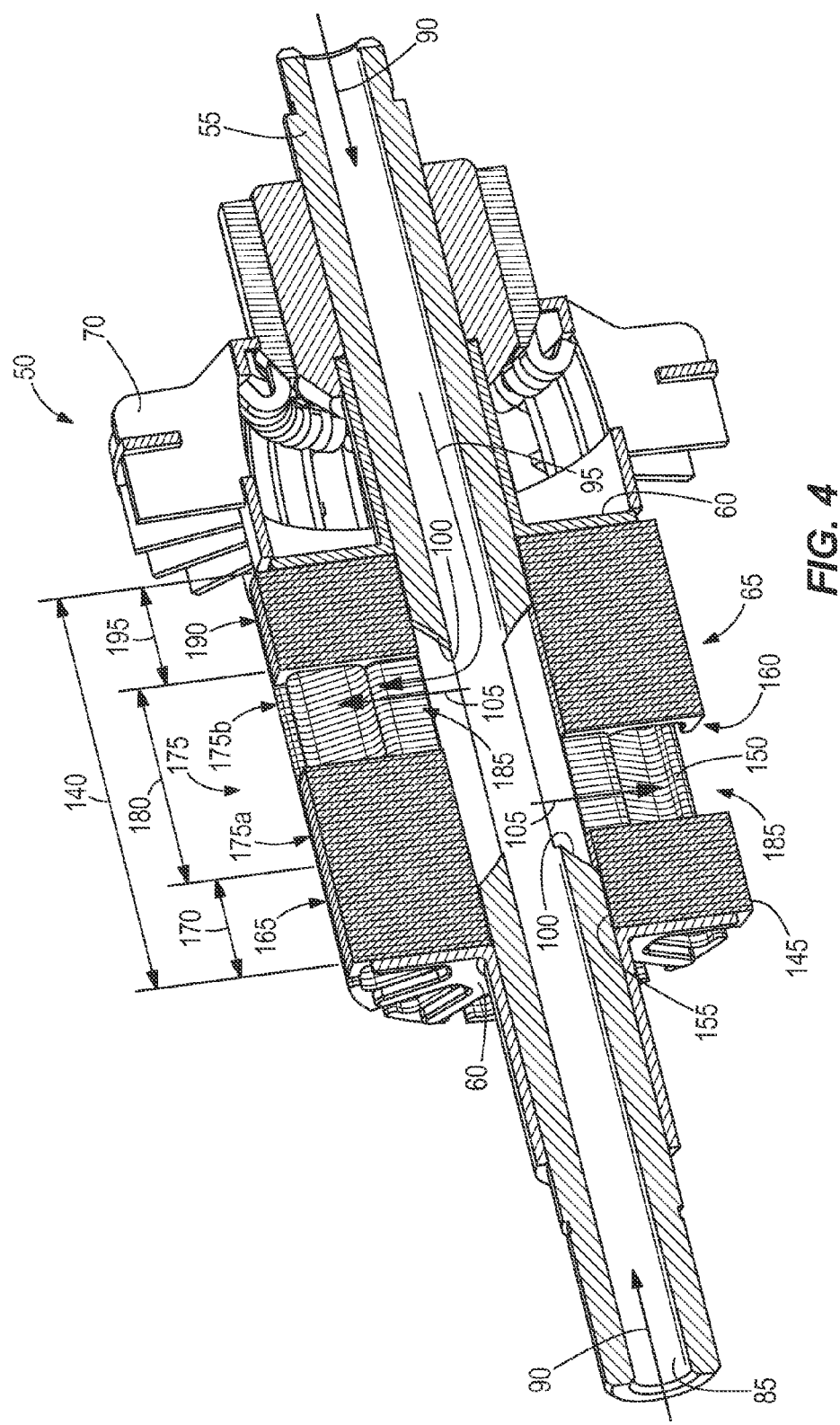
FIG. 4 is a perspective cross section of the rotating assembly of FIG. 2 taken along the rotational axis.
Figure 16:
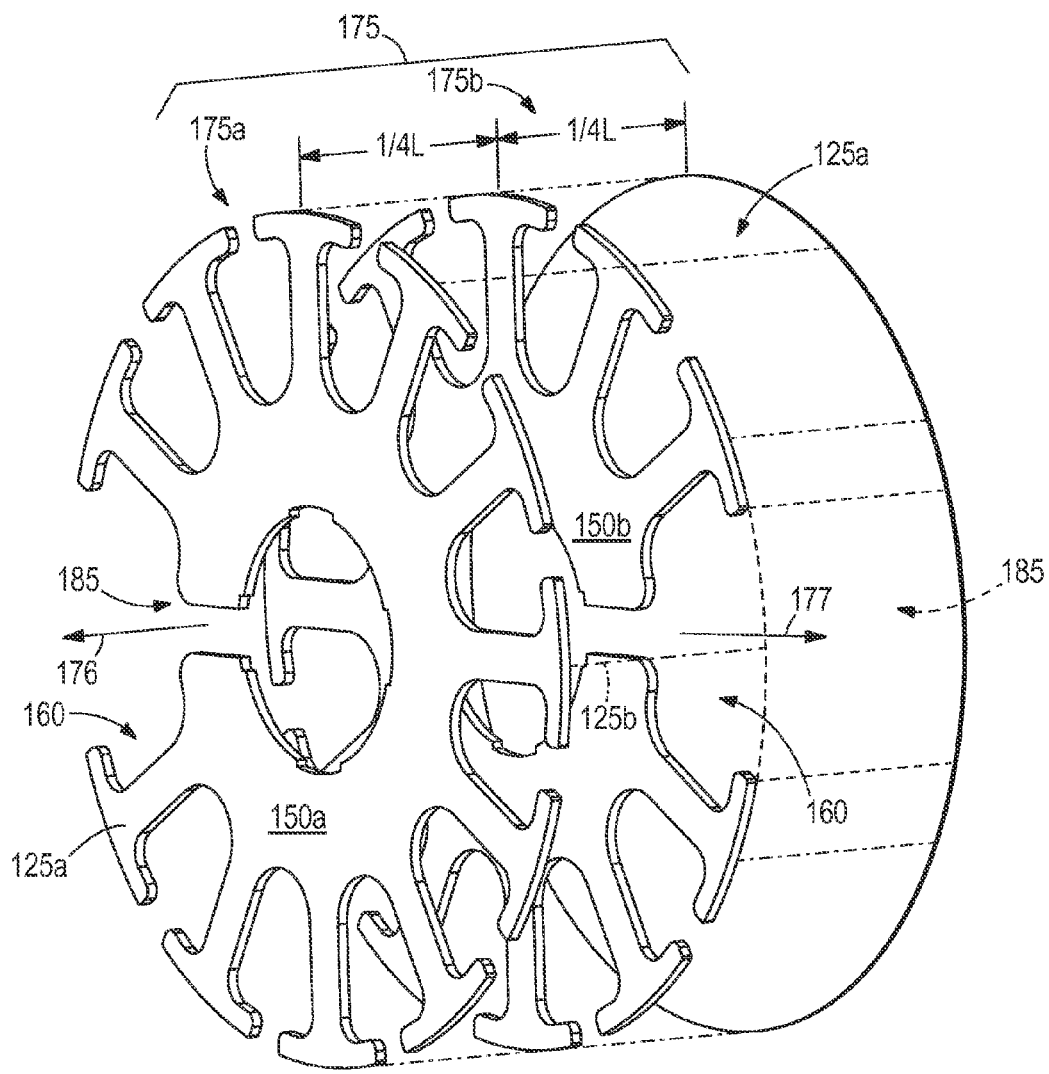
FIG. 16 is a perspective view of a second core portion made up of two sections of the second lamination of FIGS. 14 and 15 aligned to define two gaps.

A second magnetic core portion 175 is formed by stacking the second laminations 150 along the rotational axis 80 for a second portion 180 of the core length 140. As is best illustrated in FIG. 4, the second laminations 150 are stacked in two groups 175a, 175b with the slots 160 of each group aligned with one another. As is best illustrated in FIG. 16, the two groups 175a, 175b are stacked adjacent one another with the slots 160 positioned 180 degrees apart such that the slots 160 define two gaps 185 that are 180 degrees apart. FIG. 16 illustrates the first lamination 150a of the first group 175a having a slot facing in a first direction 176 and the first lamination 150b of the second group 175b having a slot facing in a second direction 177 opposite the first direction 176. Multiple laminations 150a are stacked such that they are aligned with the slot in the first direction 176 to complete the first group 175a and multiple laminations 150b are stacked such that they are aligned with the slot in the second direction 177 to complete the second group 175b. The second magnetic core portion 175 thus includes ten complete teeth 125a and two gaps 185. Of course, other constructions may include fewer or more gaps 185 as may be required to achieve the desired level of cooling or operation.

A third magnetic core portion 190 is formed by stacking a plurality of the first laminations 145 along a third portion 195 of the core length 140. The third magnetic core portion 190 includes twelve complete teeth 125a.

The first portion of the core length 170, the second portion of the core length 180, and the third portion of the core length 195, when totaled, are equal to the total core length 140. In one construction, the completed magnetic core has a length "L" and includes for example, a first magnetic core portion 165 having an axial length "¼ L", a second magnetic core portion 175 including a first group 175a having a length "¼ L" and a second group 175b having a length "¼ L", and a third magnetic core portion 190 having a length "¼ L". The twelve teeth 125a of the first magnetic core portion 165 cooperate with the ten complete teeth 125a of the second core portion 175 and with the twelve complete teeth 125a of the third core portion 190 to define ten complete teeth 125a that extend the full length of the magnetic core 65. The two gaps 185 are positioned between the teeth 125a of the first core portion 165 and the third core portion 190 such that two partial-length teeth 125b are formed. Each of the partial teeth 125b includes a first tooth portion at one end of the magnetic core 65, a second tooth portion at the opposite end of the magnetic core 65, and the gap 185 between the first tooth portion and the second tooth portion.

As is best illustrated in FIG. 4, the cooling flow path 95 includes the axial portion 90 that extends through the entire length of the interior 85 of the shaft 55. The cooling flow path 95 also includes the radial slots 100 of the shaft 55 and the gaps 185 which cooperate to define the complete radial portion 105 of the flow path 95. During operation, cooling air enters the shaft 55 at one or both ends and flows along the axial portion 90 of the cooling flow path 95. The air reaches the radial slots 100 of the shaft 55 and flows outward through the radial slots 100 and the gaps 185. As the air flows through the gaps 185 it flows past the windings 40 disposed within the slots 130 adjacent the gaps 185 and cools the windings 40.

In another construction, shown in FIGS. 5-9, a magnetic core 200 has a core length 205 and includes a first rotor magnetic core portion 210 and a second rotor magnetic core portion 215. The first rotor magnetic core portion 210 includes a plurality of laminations 220 stacked contiguously on a shaft 225. Each of the laminations 220 includes twelve teeth 230 such that the laminations 220 cooperate to define twelve complete teeth 230a that extend axially for a portion of the core length 205. Each of the plurality of teeth 230 cooperates with an adjacent tooth 230 to define a slot 235. Four apertures 240 are formed in each of the laminations 220 to define a first attachment portion 245.

Figure 7:
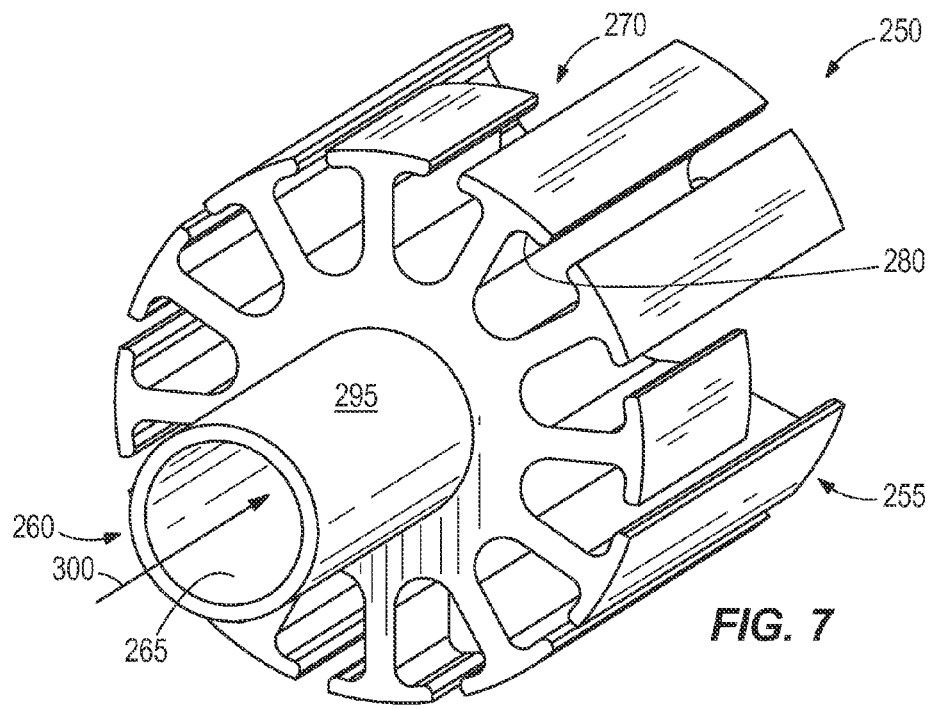
FIG. 7 is a perspective view of a one-piece magnetic component of the rotor of FIG. 5.

Referring to FIG. 7, the second rotor magnetic core portion 215 includes a one-piece magnetic component 250 having a core portion 255 and a support portion 260. In the illustrated construction, the one-piece magnetic component 250 is made of a soft magnetic composite (SMC) material. A central aperture 265 is defined through the one-piece magnetic component 250 and extends between a first end and a second end of the magnetic component 250.

The core portion 255 of the magnetic component 250 includes a length that together with the portion of the core length defined by the first core portion 210 extends the full magnetic core length 205. The core portion 255 includes twelve teeth 230 with eight of the teeth 230a extending the full length of the core portion 255 and four teeth 230b extending only a portion of the length to define a radial gap 270. Each radial gap 270 extends through the magnetic component 250 to the central aperture 265 to define a radial flow path 275 through the magnetic component 250. Like the laminations 220, each tooth 230 cooperates with an adjacent tooth 230 to define a slot 235. In addition, each tooth 230 includes two hooks 280 with each hook 280 disposed in one of the slots 235. While the magnetic core 200, including the laminations 220 and the magnetic component 250, has been described as including twelve teeth 230, other constructions may include fewer or more teeth 230 as may be required for the motor. In addition, the magnetic component 250 has been described as including four gaps 270. However, more or fewer gaps 270 could be employed as may be required to achieve the desired cooling.

Figure 8:
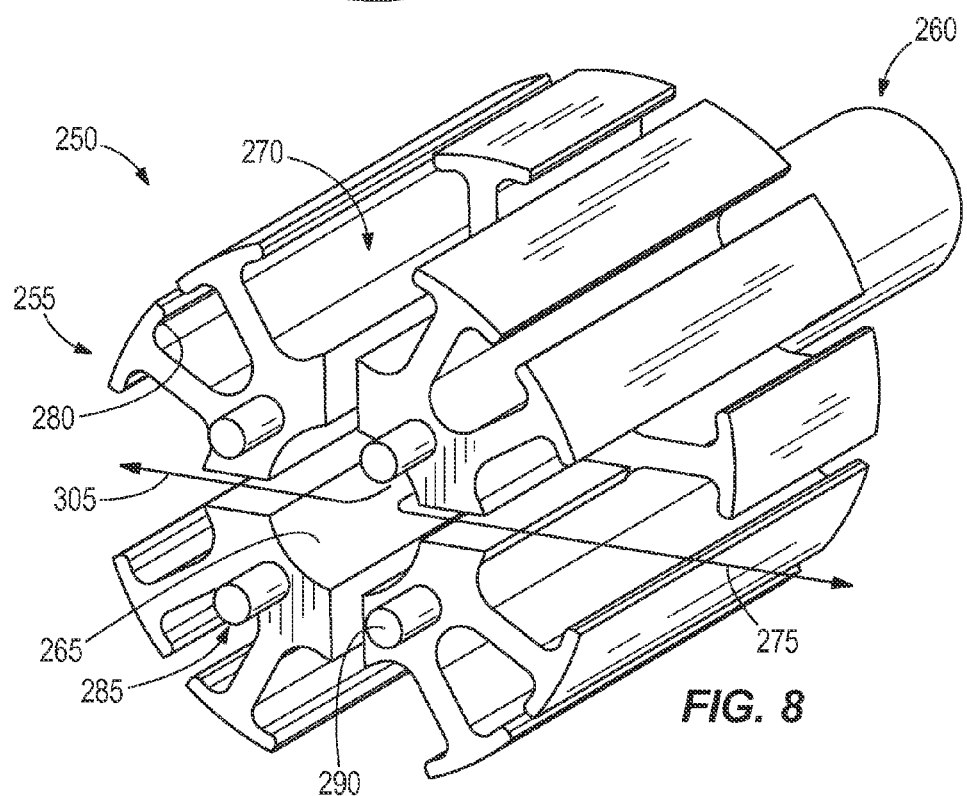
FIG. 8 is another perspective view of the one-piece magnetic component of the rotor of FIG. 5.

With reference to FIG. 8, the magnetic component 250 includes a second attachment portion 285 that includes four pins 290 that extend along axes parallel to the rotational axis 80 of the rotor. Each of the pins 290 is sized to engage one of the apertures 240 of the first attachment portion 245 to couple the first core portion 210 to the second core portion 215 for rotation. As one of ordinary skill will realize, other attachment arrangements could be employed to couple the first core portion 210 and the second core portion 215 for rotation. For example, in some constructions, the pins 290 can be replaced with through bores that receive through bolts. The use of through bolts provides added rigidity in applications that may be subjected to significant bending.

With the first core portion 210 and the second core portion 215 coupled, the teeth 230 are aligned such that they cooperate to define eight teeth 230a that extend the full length 205 of the magnetic core 200 and four teeth 230b that extend only partially along the length 205 of the magnetic core 200. Specifically, the partial-length teeth 230b include a first tooth portion adjacent one end of the magnetic core 200, a second tooth portion adjacent the opposite end of the core 200, and the gap 270 therebetween.

The support portion 260, best illustrated in FIG. 7 includes a shaft or tube 295 that defines the central opening 265 that extends along the rotational axis 80 through the magnetic component 250. The opening 265 defines an axial portion 300 of a cooling flow path 305 as will be discussed in detail. While the illustrated construction includes the support portion 260 formed as one piece with the core portion 255, other constructions could form these components as two separate pieces and then fixedly attach them to one another.

A first bearing 310 is coupled to the support portion 260 as shown in FIGS. 5 and 9. The first bearing 310 cooperates with a second bearing 315 to fully support the rotor for rotation.

FIGS. 5 and 9 best illustrate the cooling flow path 305 of the construction of FIGS. 5-9. The cooling air enters the cooling flow path 305 via the opening 265 of the support portion 260 and flows axially along the rotational axis 80. Upon reaching the gaps 270 in the magnetic component 250, the cooling air is directed radially outward. As the air flows through the gaps 270, it flows over the windings 40 positioned in the slots 235 adjacent the gaps 270, thereby cooling the windings 40.

To assemble the magnetic core 65 of FIGS. 2-4, the laminations 145, 150 are stacked as described to define the first core portion 165, the second core portion 175 (including one or more gaps 185), and the third core portion 190. In preferred constructions, the laminations 145, 150 include a slight interference fit with the shaft 55 with other means of coupling the laminations 145, 150 and the shaft 55 for rotation. The first end clamp 60 and the second end clamp 60 are fixedly coupled to the shaft 55 and cooperate to axially retain the laminations 145, 150. The windings 40 are then placed in the slots 130 in a conventional manner to complete the magnetic core 65.

The assembly of the magnetic core 200 of FIGS. 5-9 is similar to that for FIGS. 2-3. The first rotor magnetic core portion 210 is first assembled by stacking the laminations 220 in a manner similar to that described with regard to FIGS. 2-4. The second magnetic core portion 215 is then coupled to the first rotor magnetic portion 210. The first engagement portion 245 and the second engagement portion 285 engage one another to inhibit relative rotation between the first rotor magnetic core portion 210 and the second rotor magnetic core portion 215. In the illustrated construction, the four pins 290 of the second magnetic core portion 215 engage the four apertures 240 of the first magnetic core portion 215. The windings 40 are then placed in the slots 235 in a conventional manner to complete the magnetic core 200.

Figure 11:
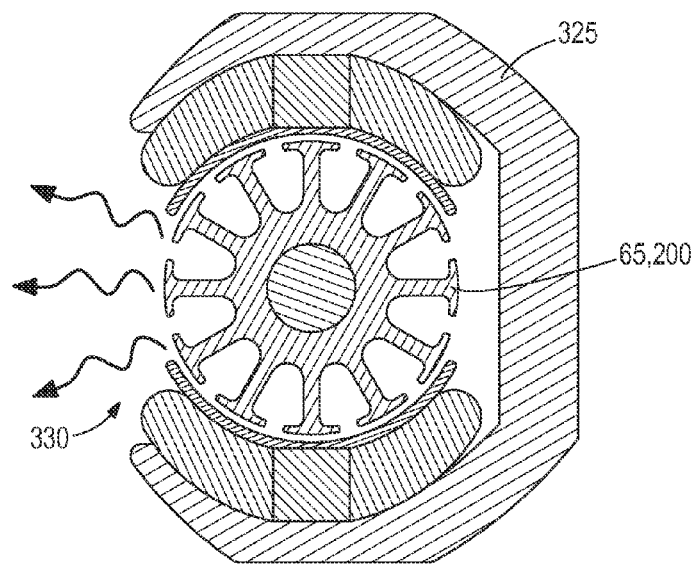
FIG. 11 is a schematic illustration of another motor including an open flux ring for use with the rotor of FIG. 2 or FIG. 5.

It is also possible to enhance the cooling effect achieved with the magnetic core 65, 200 of FIGS. 2-9 by modifying a stator 320, 325 as illustrated in FIGS. 10 and 11. Specifically, a portion 330 (FIG. 11) or portions 330 (FIG. 10) of the side of the flux rings are removed to provide a freer air flow path through the magnetic cores 65, 200 and the stator 320, 325. As one of ordinary skill will realize, the magnetic flux of the stator 320, 325 typically flows between poles in a fixed axial plane (i.e., a radial return path). In other words, the magnetic flux does not generally extend or deviate in the axial direction but rather remains radial. However, to accommodate the removed portion 330 or portions 330 of the flux ring, a magnetic end ring 335 or flux ring is used to support one of the bearings 310 as illustrated in FIG. 12. The magnetic end ring 335 provides a magnetic path for the magnetic flux, thereby completing the magnetic circuit of the stator 320, 325. The stator 320 of FIG. 10 is best suited for permanent magnet fields while the stator 325 of FIG. 11 is more appropriate for a wound field.

FIGS. 17-22 illustrate a rotor assembly 450 according to another construction. The rotor assembly 50 is similar to the rotor assembly 450; therefore, like components have been given like reference numbers plus 400 and only differences between the rotor assemblies 50 and 450 will be discussed in detail. In addition, components or features described with respect to only one or some of the constructions described herein are equally applicable to any other constructions described herein.

Figure 12:
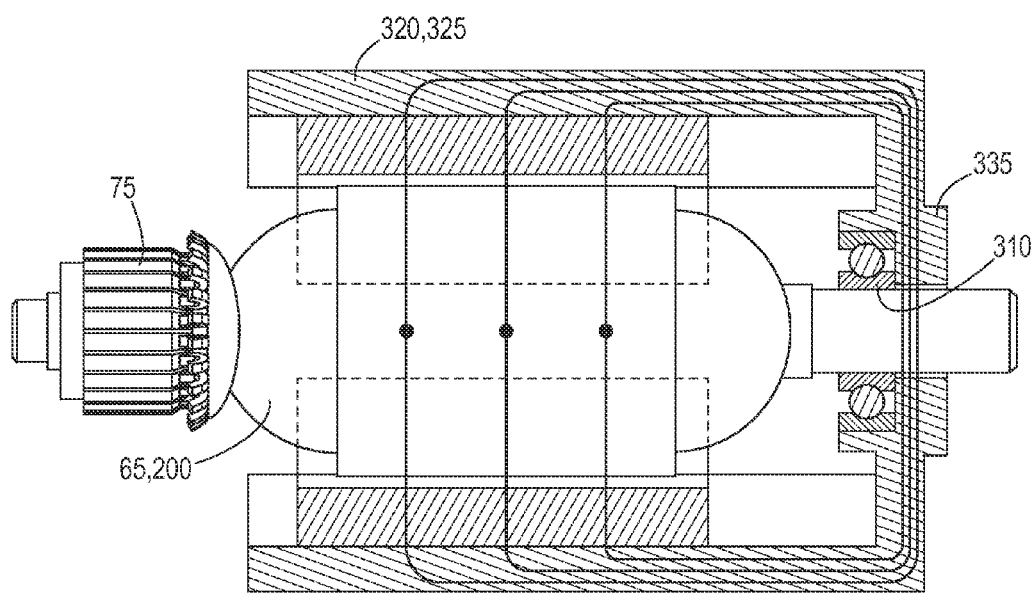
FIG. 12 is a schematic illustration of an axial field return path for use with the motor of FIG. 10 or FIG. 11.

The rotor assembly 450 is suitable for use with the stator 15 of FIG. 1 or alternatively with another stator (FIGS. 10-12). The rotor 450 includes a shaft 455, a pair of clamps 460, a magnetic core 465, and a commutator 475. The rotor 450 may also include a fan (similar to fan 70) which is fixedly coupled to the shaft 455 adjacent the magnetic core 465 so that the fan rotates with the shaft 455 and provides cooling air to the electric motor. In other motors, other types of fans or other fan arrangements may be employed. In some motors, the fan may be omitted entirely. The magnetic core 465 includes rotor windings 440 (FIG. 20) that cooperate with the teeth 437 (FIG. 17) to define rotor poles. The commutator 475 is fixedly coupled to the shaft 455 and is connected to the windings 440 to periodically reverse the direction of the current in the windings while the motor is operating.

Figure 18:
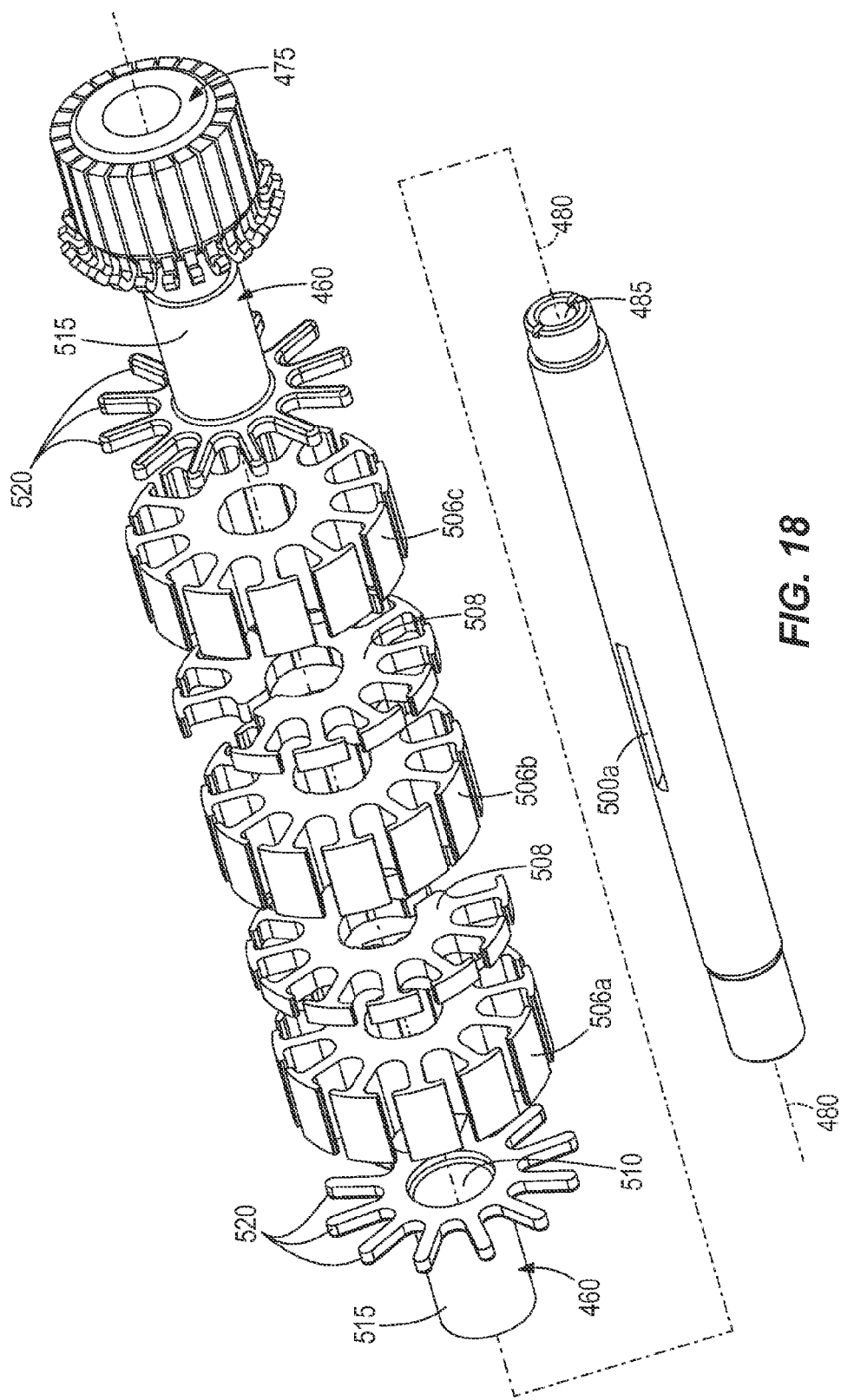
FIG. 18 is an exploded view of the rotating assembly of FIG. 17.
Figure 19:
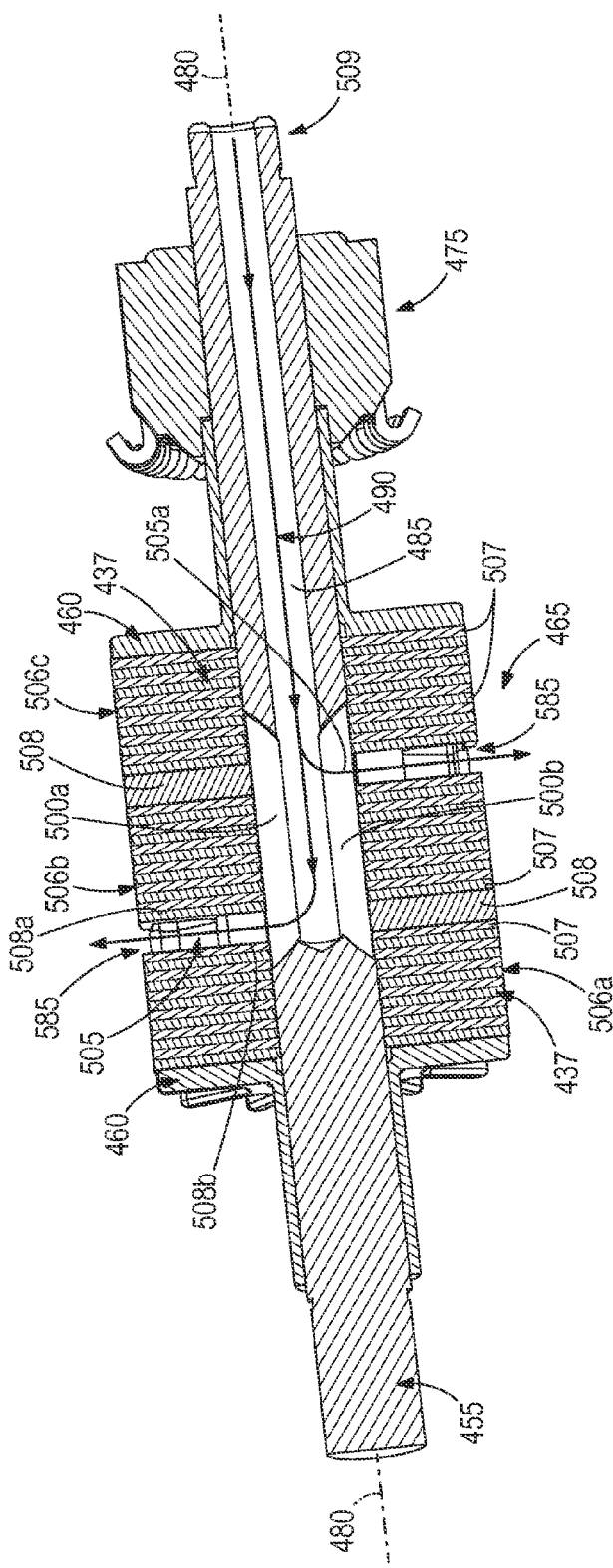
FIG. 19 is a section view of the rotor assembly of FIG. 17 taken along the rotational axis of the rotor.

The shaft 455, best illustrated in FIGS. 18 and 19, is an elongated substantially cylindrical member that provides rotational support to the rotating components of the motor. In the illustrated construction, the shaft 455 extends along a longitudinal or rotational axis 480 and includes a first end and a second end. A central aperture 485 extends through at least a portion of the length of the shaft 455 and defines a cooling flow path 490 as will be discussed in detail with regard to FIG. 19. Two openings, in this construction radial slots 500a, 500b (one on each side of the shaft), are defined through the shaft 455. Slot 500a defines a portion of a radial portion 505 of the cooling flow path 490. The illustrated construction shows a single slot 500a, 500b on each side of the shaft 455, but multiple smaller apertures could be employed in place of each slot 500a, 500b if desired.

With reference to FIG. 18, each of the clamps 460 includes a central bore 510 sized to engage the shaft 455 (however, only one central bore 510 is shown in FIG. 18). Preferably, a shrink fit is provided to fixedly attach the clamps 460 to the shaft 455. Other constructions may use an adhesive, welding, soldering, brazing or another means of attachment.

Each of the clamps 460 includes a central hub portion 515 and a plurality of fingers 520 that extend radially outward from an end portion of each of the central hub portions 515. The fingers 520 have a length and define slots therebetween. The central hub portions 515 and the plurality of fingers 520 have a sufficient rigidity and strength to clamp the magnetic core 465 and inhibit unwanted axial movement.

Figure 17:
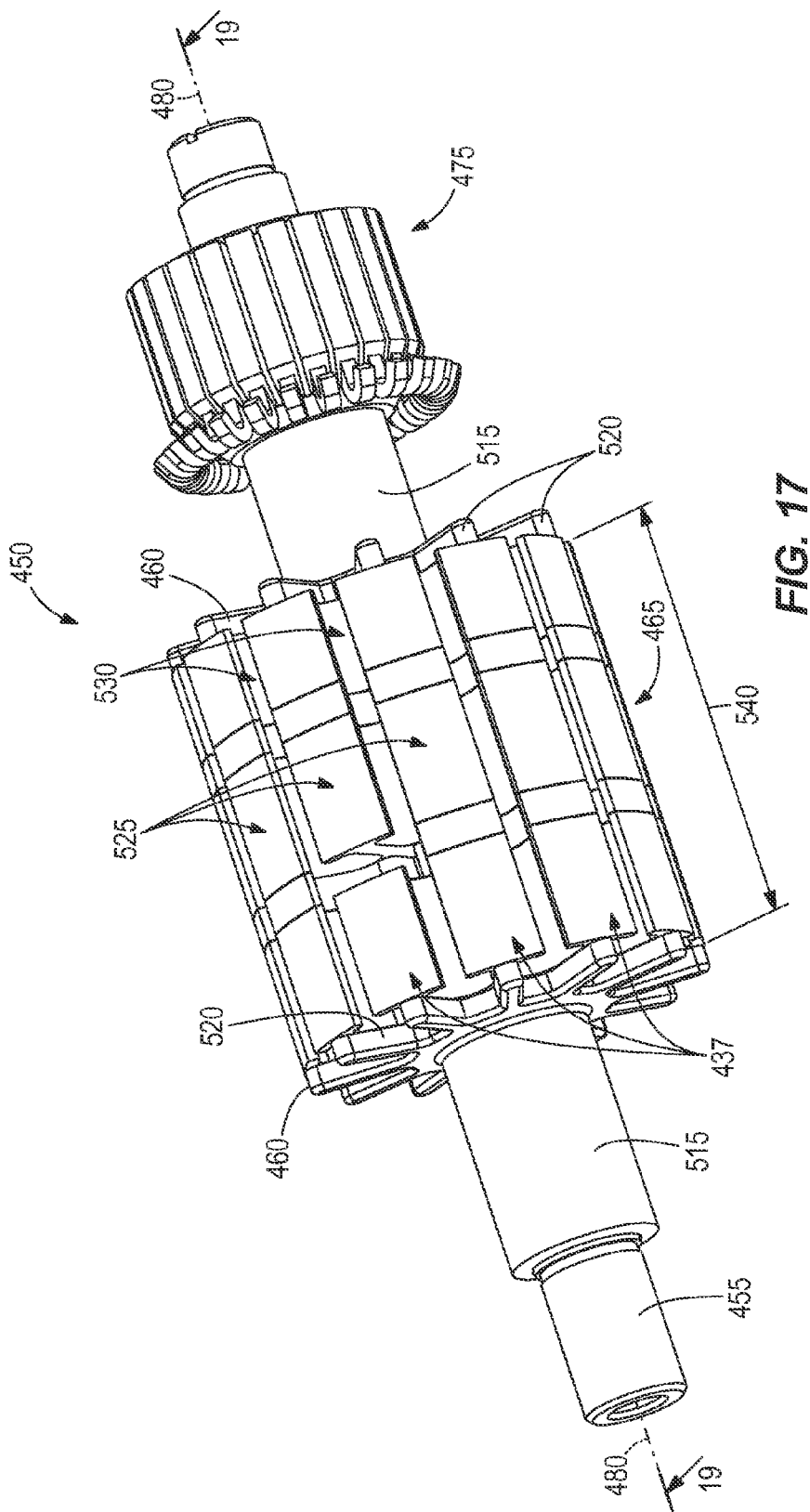
FIG. 17 is a perspective view of a rotating assembly for an electric motor having a rotor core according to another construction.
Figure 20:
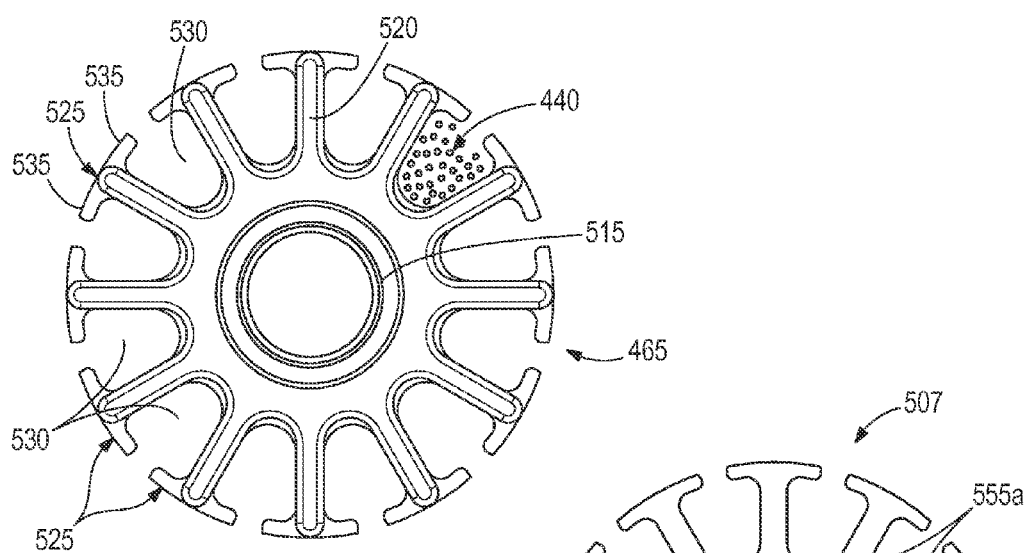
FIG. 20 is an end view of the rotor assembly of FIG. 17.

As shown best in FIGS. 17 and 20, the magnetic core 465 is a substantially cylindrical member that is rotationally supported by the shaft 455. The magnetic core 465 includes twelve teeth 525. Each tooth 525 cooperates with an adjacent tooth 525 to define a slot 530. Each tooth 525 includes two hook surfaces 535 with each of the hook surfaces 535 extending into one of two adjacent slots 530. Windings 440 (shown schematically in only one of the slots 530 within FIG. 20) are coupled to a portion of the teeth 525 and are each disposed in at least two of the slots 530 in the same manner as the prior art shown in FIG. 1. In other constructions, motors having more or fewer teeth 525 can also utilize the invention described herein.

Figure 21:
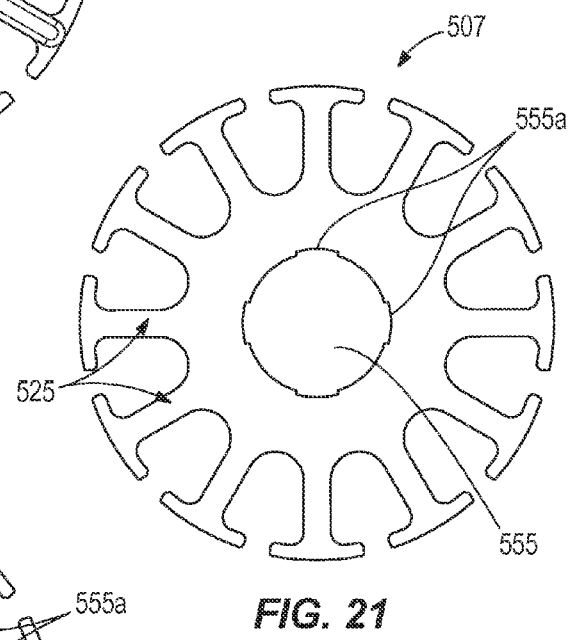
FIG. 21 is an end view of a lamination of a first core portion.
Figure 22:
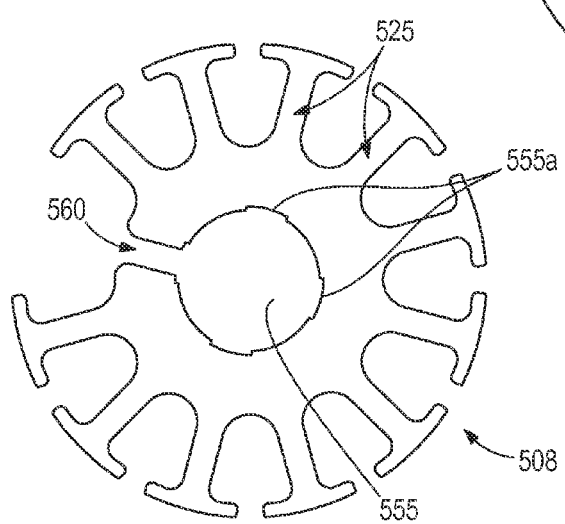
FIG. 22 is an end view of a second core portion or non-conductive spacer.

With reference to FIG. 18, the magnetic core 465 includes stacks 506a, 506b and 506c, or first core portions, each having a plurality of laminations 507 shown in detail in FIG. 21. The laminations 507 are stacked along the rotational axis 480. Each stack 506a, 506b and 506c is separated by a spacer 508, or second core portion (FIG. 22). The spacers 508 are a solid piece of material. In other constructions, the spacers 508 may include a plurality of laminations. The stacks 506a, 506b and 506c and the spacers 508 define a core length 540 as shown in FIG. 17. In the illustrated construction, the laminations 507 and the spacers 508 are generally planar and perpendicular to the axis of rotation of the motor with an appropriate thickness. In other constructions, at least some of (or all of) the laminations 507 and the spacers 508 may not be flat. For example the laminations 507 and the spacers 508 may be generally biconvex, generally biconcave, generally plano-convex, generally plano-concave, generally meniscus-shaped, generally frustoconical, or have any other appropriate shape. In further constructions, the stacks 506a, 506b, and 506c may be differently constructed without the use of laminations 507. For example, the first core portions 506a, 506b, and 506c may be constructed out of a solid piece of material.

Furthermore, the laminations 507 and the spacers 508 may include at least one retaining feature which cooperate with at least one corresponding retaining feature on the shaft 455 to couple the laminations 507 and the spacers 508 to the shaft 455 for rotation. For example, the laminations 507 and spacers 508 include a central bore 555 which includes four recesses 555a which may cooperate with corresponding projections (not shown) on the shaft 455 to couple the laminations 507 and the spacers 508 to the shaft 455 for rotation.

The laminations 507 are a magnetic conductor which includes a relatively good ability to support the formation of a magnetic field within itself and/or to direct magnetic flux. For example, the laminations 507 are formed from steel. The spacers 508 are described as being a magnetic insulator which includes a relatively poor ability to support the formation of a magnetic field within itself and/or to direct magnetic flux. For example, the spacers 508 are formed from non-conductive materials such as mica, plastic material, phenolic material, fiber material, and the like. In other constructions, the laminations 507 and the spacers 508 may be formed from any appropriate material or combination of materials provided that the laminations 507 are a magnetic conductor and the spacers 508 are a magnetic insulator. It is advantageous for the spacers 508 to use a lighter weight material than the laminations 507 to enhance balanced rotational movement of the rotor 450.

In addition, the magnetic permeability of the laminations 507 is greater than the magnetic permeability of the spacers 508. In some constructions, the magnetic permeability of the laminations 507 is significantly greater than the magnetic permeability of the spacers 508. For example, the relative permeability the laminations 507 may be greater than about 100, preferably greater than about 500 and more preferably greater than about 1000. In some constructions, the relative permeability of the spacers 508 may be less than about 100, preferably less than about 50, and more preferably less than 10. In addition, the laminations 507 may be an electric conductor and/or a conductor of heat, and the spacers 508 may be an electric insulator and/or an insulator of heat.

The laminations 507 includes twelve teeth 525 and extends completely around a central bore 555. As previously discussed, the stacks 506a, 506b and 506c are formed by stacking a plurality of the laminations 507. Thus, the stacks 506a, 506b and 506c include twelve teeth 525 which extend completely around the central bore 555.

The spacers 508 include eleven teeth 525 with a slot 560 formed in place of the twelfth tooth (compared to the laminations 507) and extending from the central bore 555 to the (radially) outermost portion of the spacers 508.

As is best illustrated in FIG. 19, the cooling flow path 490 extends through central aperture 485 of the shaft 455. The cooling flow path 490 also includes the radial slot 500a of the shaft 455 and a gap 585 (between stacks 506a and 506b) which cooperate to define the radial portion 505 of the flow path 490. In other words, a first spacer 508 defines, at least in part, the radial portion 505 of the air flow path 490. The radial portion 505 of the air flow path 490 is also defined, at least in part, by surfaces 508a and 508b of the laminations 507 adjacent the spacer 508. In other words, the first spacer 508 is sandwiched between the lamination 507 (having surface 508a) and the lamination 507 (having surface 508b).

The magnetic core 465 also includes a second radial portion 505a of the air flow path 490. The radial slot 500b of the shaft 455 and the gap 585 (located between stacks 506b and 506c) cooperate to define the second radial portion 505a of the flow path 490. As previously discussed in relation to the first radial portion 505 of the flow path 490, a second spacer 508 defines, at least in part, the second radial portion 505a of the air flow path 490. The second radial portion 505a of the air flow path 490 is also defined, at least in part, by two laminations 507. In other words, the second spacer 508 is sandwiched between the laminations 507 to define the second radial portion 505a.

The gaps 585 which define the radial portions 505, 505a of the flow path 490 are angularly spaced about the axis 480 by about 180 degrees. This ensures that air flowing through the gaps 585 cools the windings 440 on both sides of the magnetic core 465. In other constructions, the angularly spacing between the gaps 585 may be less than 180 degrees. In further constructions, the gaps 585 may be orientated differently relative to the rotational axis 480. For example, at least one radial portion 505, 505a of the flow path 490 may circle (e.g., spiral) around the rotational axis 480 before exiting the gaps 585.

During operation, cooling air enters the shaft 455 at an end 509 of the shaft 455 and flows along the cooling flow path 490. The air reaches the radial slots 500a, 500b of the shaft 455 and flows outward through respective radial portions 505, 505a and the gaps 585. As the air flows through the gaps 585 it flows past the windings 440 disposed within the slots 530 adjacent the gaps 585 and cools the windings 440. In other constructions, a desired fluid (liquid or gas) may pass through the flow path 490 to cool the motor. It is also possible to enhance the cooling effect achieved with the magnetic core 465 by modifying a stator 320, 325 as illustrated in FIGS. 10 and 11 as previously described above.

The rotor constructions illustrated herein or the rotor constructions in combination with the stator constructions provide for more efficient cooling of the motor during operation. The enhanced cooling can increase the life of the motor and can improve the durability of the insulating materials used to construct the motor. In addition, the enhanced cooling can allow for greater current density without overheating the rotor or stator components. The ability to carry additional current allows for a higher amp rating for a motor of a given construction (i.e., wire type and diameter, number of windings per coil, etc.) which in turn provides additional torque output for the motor.

Various features and advantages of the invention are set forth in the following claims.

What is claimed is:

1. An electric motor comprising:
a stator operable to produce a magnetic field, the stator defining an opening; and
a rotor at least partially disposed within the opening, the rotor including,
a shaft extending along a rotational axis;
a plurality of first core portions each including a plurality of laminations stacked contiguously on the shaft; wherein each lamination includes a first plurality of teeth;
a second core portion coupled between each of the first core portions, the second core portion including a second plurality of teeth aligned with the first plurality of teeth about a circumference of the second core portion; at least the first core portions and the second core portion cooperating to define a rotor magnetic core;
a plurality of windings coupled to the rotor magnetic core; and
an air flow path partially defined by the first core portions, the second core portion, and the shaft, the air flow path including an axial portion that passes through the shaft axially along the rotational axis and a radial portion that extends radially outward through the second core portion;
wherein the second plurality of teeth is less than the first plurality of teeth, wherein each of the first core portions is a magnetic conductor and the second core portion is a magnetic insulator, and wherein the second core portion is a single one-piece component formed from non-conductive material;
wherein the second core portion includes a central aperture for the shaft, a peripheral surface, and at least one slot between two adjacent teeth that defines a gap, the slot extending from the central aperture to the peripheral surface;
wherein the gap partially defines the radial portion of the air flow path, and wherein the shaft includes a radial slot in fluid communication with the gap.

2. An electric motor according to claim 1, wherein the plurality of first core portions are formed from steel and the second core portion is formed from mica.

3. The electric motor of claim 1, wherein the second core portion weighs less than an equal axial length of each of the first core portions.

4. The electric motor of claim 1, wherein the rotor magnetic core includes three first core portions, wherein the second core portion is a first of the second core portions positioned between a first and a second of the first core portions, wherein the electric motor further comprises a second of the second core portions positioned between the second and a third of the first core portions, and wherein the gaps of the respective second core portions are located at different circumferential positions.

5. The electric motor of claim 1, further comprising a first end clamp fixedly coupled to the shaft and a second end clamp fixedly coupled to the shaft, the first end clamp and the second end clamp cooperating to retain the rotor magnetic core on the shaft.

6. The electric motor of claim 1, wherein the first plurality of teeth are contiguous with the second plurality of teeth along the combined length of the first and second core portions.

7. The electric motor of claim 1, wherein the first core portions and the second core portion have the same diameter.

8. The electric motor of claim 1, wherein the slot of the second core portion defines a break in the second core portion such that the second core portion does not extend completely around the shaft, and wherein each lamination completely surrounds the shaft.

9. A power tool comprising:
   a housing;
   an electric motor disposed within the housing including,
      a stator operable to produce a magnetic field, the stator defining an opening; and
      a rotor at least partially disposed within the opening, the rotor including,
         a shaft extending along a rotational axis;
         a plurality of first core portions each including a plurality of laminations stacked contiguously on the shaft; wherein each lamination includes a first plurality of teeth;
         a second core portion coupled between each of the first core portions, the second core portion including a second plurality of teeth aligned with the first plurality of teeth about a circumference of the second core portion; at least the first core portions and the second core portion cooperating to define a rotor magnetic core;
         a plurality of windings coupled to the rotor magnetic core; and
         an air flow path partially defined by the first core portions, the second core portion, and the shaft, the air flow path including an axial portion that passes through the shaft axially along the rotational axis and a radial portion that extends radially outward through the second core portion;
   wherein the second plurality of teeth is less than the first plurality of teeth, wherein each of the first core portions is a magnetic conductor and the second core portion is a magnetic insulator, wherein the second core portion is a single one-piece component formed from non-conductive material;
   wherein the second core portion includes a central aperture for the shaft, a peripheral surface, and at least one slot between two adjacent teeth that defines a gap, the slot extending from the central aperture to the peripheral surface;
   wherein the gap partially defines the radial portion of the air flow path, and wherein the shaft includes a radial slot in fluid communication with the gap.

10. The power tool of claim 9, wherein the first plurality of teeth are contiguous with the second plurality of teeth along the combined length of the first and second core portions.

11. The power tool of claim 9, wherein the rotor magnetic core includes three first core portions, wherein the second core portion is a first of the second core portions positioned between a first and a second of the first core portions, wherein the electric motor further comprises a second of the second core portions positioned between the second and a third of the first core portions, and wherein the gaps of the respective second core portions are located at different circumferential positions.

12. The power tool of claim 9, further comprising a first end clamp fixedly coupled to the shaft and a second end clamp fixedly coupled to the shaft, the first end clamp and the second end clamp cooperating to retain the rotor magnetic core on the shaft.

13. The power tool of claim 9, wherein the second core portion weighs less than an equal axial length of each of the first core portions.

14. The power tool of claim 9, wherein the first core portions are formed from steel and the second core portion is formed from mica.

15. The power tool of claim 9, wherein the first core portions and the second core portion have equal diameters.

* * * * *